No. 677,525. Patented July 2, 1901.
T. LOVERIN, Dec'd.
C. E. LOVERIN, Administratrix.
CARRIAGE WHEEL.
(Application filed Apr. 3, 1900. Renewed Dec. 27, 1900.)
(No Model.) 2 Sheets—Sheet 1.

WITNESSES:
INVENTOR

No. 677,525. Patented July 2, 1901.
T. LOVERIN, Dec'd.
C. E. LOVERIN, Administratrix.
CARRIAGE WHEEL.
(Application filed Apr. 3, 1900. Renewed Dec. 27, 1900.)

(No Model.) 2 Sheets—Sheet 2.

WITNESSES: INVENTOR:

UNITED STATES PATENT OFFICE.

CORA E. LOVERIN, OF NASHUA, NEW HAMPSHIRE, ADMINISTRATRIX OF TRUE LOVERIN, DECEASED.

CARRIAGE-WHEEL.

SPECIFICATION forming part of Letters Patent No. 677,525, dated July 2, 1901.

Application filed April 3, 1900. Renewed December 27, 1900. Serial No. 41,234. (No model.)

*To all whom it may concern:*

Be it known that TRUE LOVERIN, deceased, formerly a citizen of the United States, residing in Nashua, in the county of Hillsboro and State of New Hampshire, did invent new and useful Improvements in Carriage-Wheels, of which the following is a specification.

This invention relates to wheels for carriages and wagons, whether drawn or driven by horse or other power, in which it is intended to include motor-carriages or automobiles; and it consists in the novel construction and arrangements of parts fully described below, and illustrated in the accompanying drawings, in which—

Figure 1:
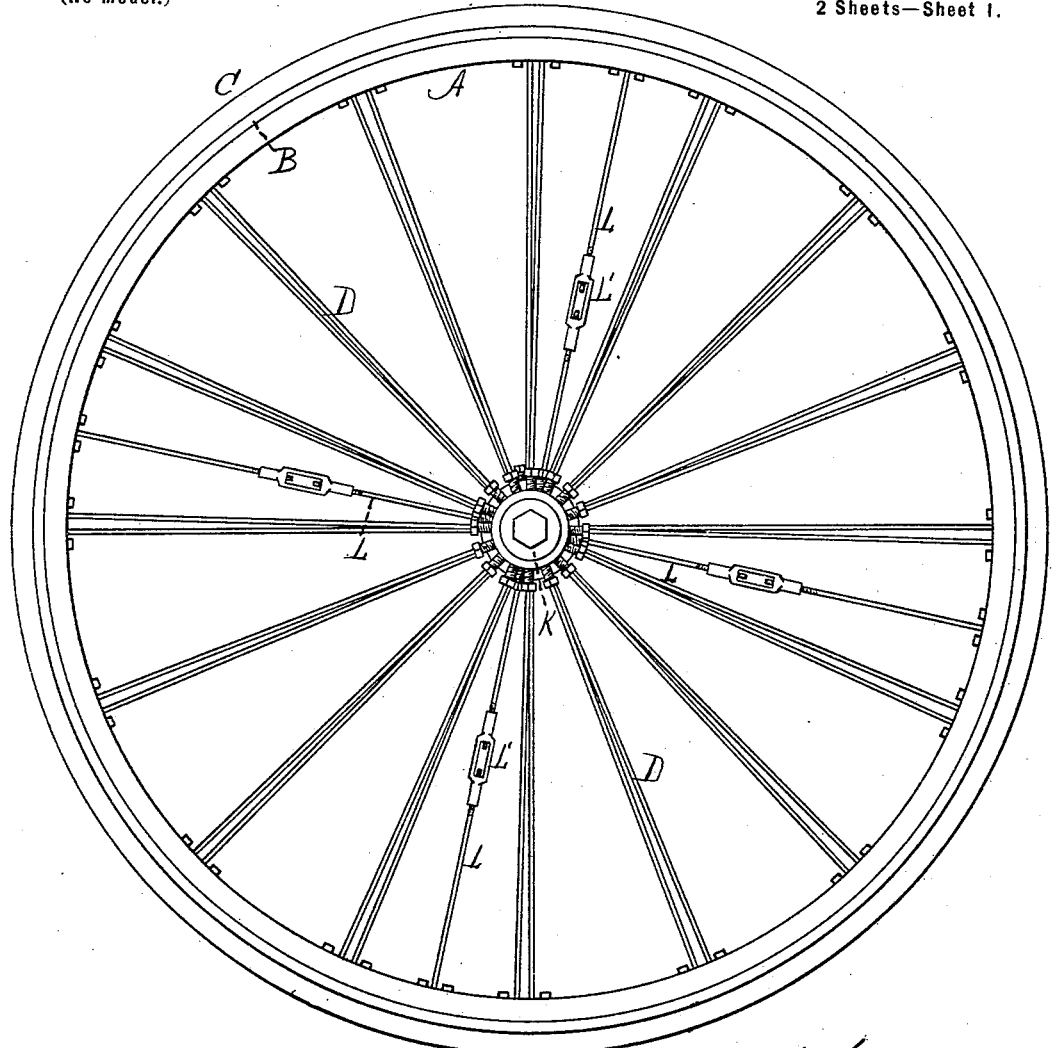
Figure 2:
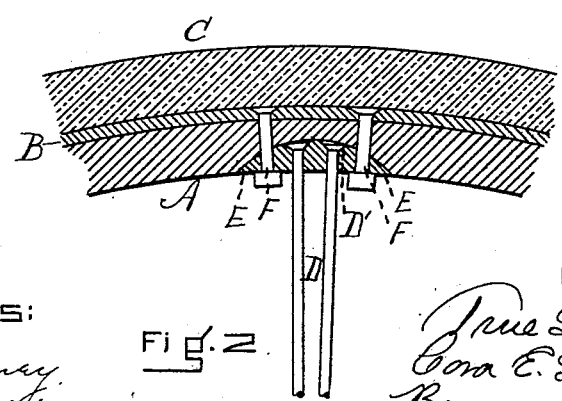
Figure 3:
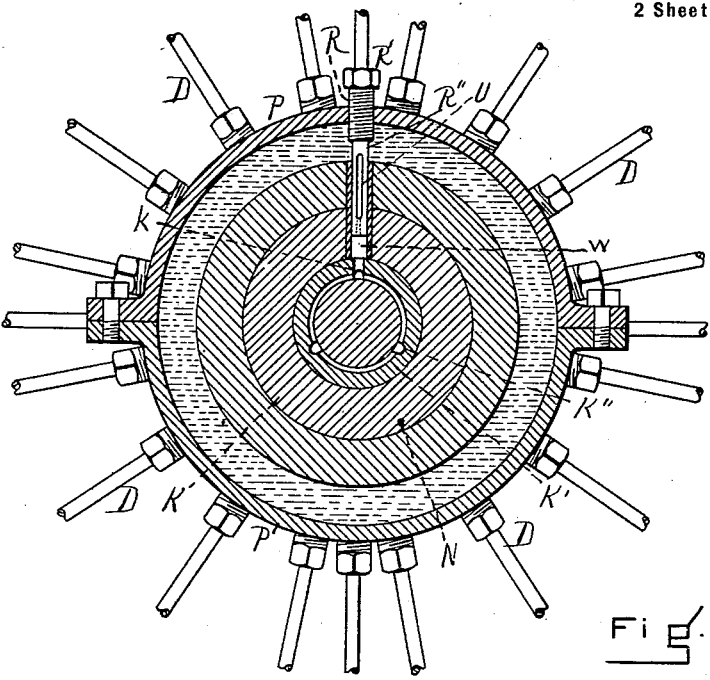
Figure 4:
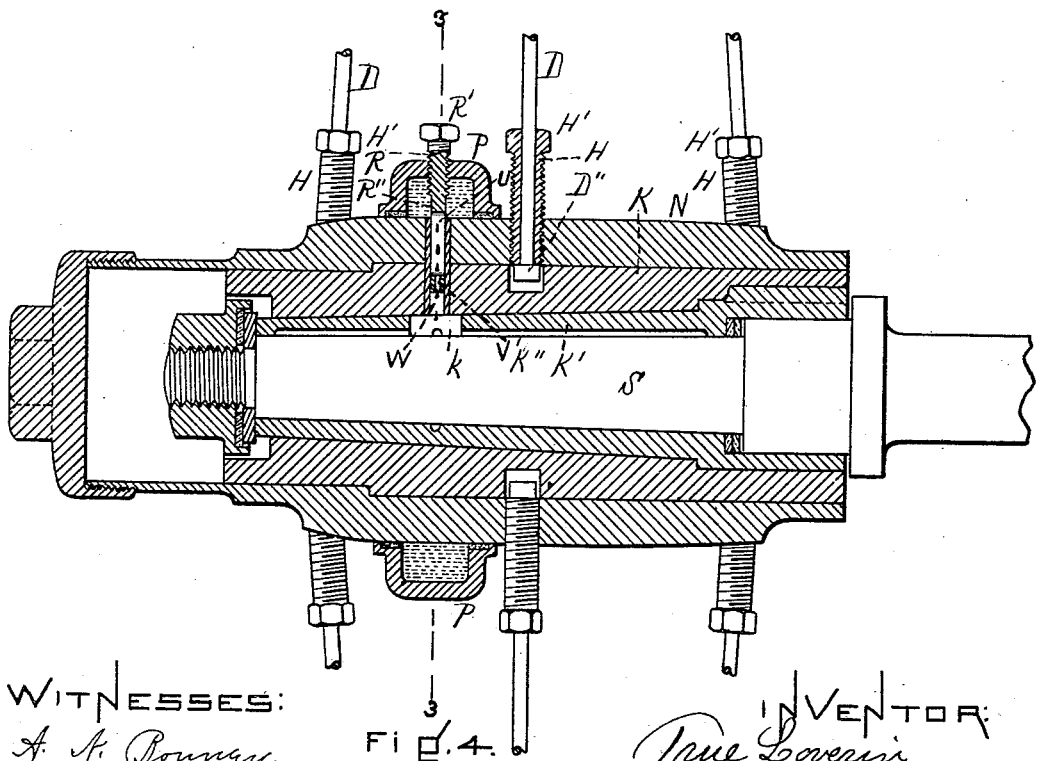

Figure 1 is a side elevation of a carriage-wheel embodying the invention. Fig. 2 is a detail in section and elevation, illustrating the means of connecting the outer ends of the spokes with the felly. Fig. 3 is a cross-section taken on line 3, Fig. 4. Fig. 4 is a longitudinal section taken through the hub.

Similar letters of reference indicate corresponding parts.

A represents the wooden felly of the wheel, B a channel-shaped metal rim, and C a rubber tire.

D D are the steel spokes, arranged in pairs. Each spoke is headed at D' and D'' at its ends, and each pair of spokes extends through a lug E of substantially the shape shown set into the felly from the under side flush with said under side and conforming to the curved line thereof, as indicated in Fig. 2. The head D' locks each spoke to the lug E, and the lug is secured to the felly by bolts or rivets F, which extend through the lug, felly, and rim or channel B. The lower end of each spoke extends through a tube or thimble H, screw-threaded on its outer surface, and thereby screwed into the hub K by means of the nut H', formed at the upper end of the tube or thimble. The head D'' holds the spoke in position.

Between certain pairs of spokes and the next pairs are intermediate or supplemental strengthening-spokes, made in two parts L, connected and tightened by a turnbuckle L'. The method of securing the ends of the intermediate spokes to the felly and hub is the same as described in connection with the spokes D. As many of these strengthening-spokes may be applied as desired.

The hub K is preferably of wood, and within it is the metallic bushing K', provided with longitudinal grooves K''.

S is the axle.

Surrounding the hub K is the sleeve or collar N, said collar, hub, and bushing all being rigidly connected. Secured to and surrounding the metallic collar N is an annular oil-reservoir P, suitably packed in order to make it oil-tight. The collar and hub are bored, as shown in Figs. 3 and 4, and connect with an elongated hole $k$ in the bushing, leading into one of the grooves K''.

R is a screw provided with a head R', adapted to be engaged by a wrench and screwing into the outer wall of the oil-receptacle P. Below the threaded portion of this screw it has a plain surface, as shown at R'', and such plain portion is provided with a longitudinal slot U, the upper end of which extends into the oil-chamber. The oil from the annular chamber works a little at a time into this slot U and thence through a small vertical bore V into the hole W in the hub, and thence drops through the chamber $k$ into the groove K'' and lubricates the axle. Thus there is a constant supply of lubricant dropping onto the axle, such supply being regulated by lifting or lowering the screw.

The oil-chamber is preferably made in two parts, Fig. 3, bolted together.

Having thus fully described the invention, what is claimed, and desired to be secured by Letters Patent, is—

1. In a carriage-wheel of the character described, the felly provided with the elongated lug E of substantially the shape shown set into the felly with its outer surface flush with the inner surface of the felly and curved to correspond with the circle described by the inner surface of the felly, said lug being of sufficient length and adapted to receive the end of two spokes one of which follows the other; the hub provided with the externally-screw-threaded tubes H screwed radially thereinto and formed with nuts H' integral with and at the outer ends of the tubes, said hubs being provided with suitable recesses next the inner ends of the tubes; and the pairs of metallic spokes D extending through said adjustable tubes and held in position by heads D″ at their inner ends, and each pair of spokes extending through one of the lugs E and held in place therein by heads D′, substantially as described.

2. In a carriage-wheel of the character described, the felly; the hub; the metallic spokes D arranged in pairs and with their outer ends secured to said felly and their inner ends secured adjustably to said hub; and the intermediate single supplemental strengthening-spokes L, each placed between two pairs of spokes D and made in two rigid parts the inner ends of which are connected by a tightening device and the outer ends secured to the felly and hub, substantially as set forth.

3. In a carriage-wheel of the character described, the hub comprising the collar N, hub proper K and bushing K′, said hub and collar being coincidently bored and said bushing being provided with the opening $k$ connecting with the bore and hub; the annular oil-reservoir P secured to said hub; and the screw R, R″ extending through said reservoir into the bore in the hub and provided with the longitudinal slot U and vertical connecting-hole V, substantially as described.

CORA E. LOVERIN,
*Administratrix of estate of True Loverin, deceased.*

Witnesses:
WM. MARTIN,
J. N. BRADSHAW.